United States Patent
Cai

(10) Patent No.: US 10,361,902 B2
(45) Date of Patent: Jul. 23, 2019

(54) METHOD AND SYSTEM FOR GUARANTEEING RESOURCE UTILIZATION RATE OF WEBSITE USING CONTENT DISTRIBUTION NETWORK

(71) Applicant: WANGSU SCIENCE & TECHNOLOGY CO., LTD., Shanghai (CN)

(72) Inventor: Zhenhe Cai, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 110 days.

(21) Appl. No.: 15/528,342

(22) PCT Filed: Dec. 30, 2014

(86) PCT No.: PCT/CN2014/095483
§ 371 (c)(1),
(2) Date: May 19, 2017

(87) PCT Pub. No.: WO2016/086482
PCT Pub. Date: Jun. 9, 2016

(65) Prior Publication Data
US 2017/0331667 A1 Nov. 16, 2017

(30) Foreign Application Priority Data

Dec. 2, 2014 (CN) .......................... 2014 1 0720273

(51) Int. Cl.
*H04L 29/08* (2006.01)
*H04L 29/12* (2006.01)
(Continued)

(52) U.S. Cl.
CPC .......... *H04L 29/08099* (2013.01); *G06F 9/00* (2013.01); *G06F 11/00* (2013.01);
(Continued)

(58) Field of Classification Search
CPC ............. H04L 43/0817; H04L 67/1008; H04L 61/1511; H04L 67/1029; H04L 67/1002; H04L 67/1034
See application file for complete search history.

(56) References Cited

U.S. PATENT DOCUMENTS

| 7,330,880 B1 * | 2/2008 | English | H04L 67/2842 709/203 |
| 7,657,622 B1 * | 2/2010 | Douglis | H04L 41/5003 709/224 |

(Continued)

FOREIGN PATENT DOCUMENTS

| CN | 102196060 | 9/2011 |
| CN | 102355596 | 2/2012 |
| WO | 2004036363 A2 | 4/2004 |

OTHER PUBLICATIONS

The European Patent Office (EPO) The extended European search report for 14907448.6 dated Jun. 20, 2018 7 Pages.
(Continued)

*Primary Examiner* — Vivek Srivastava
*Assistant Examiner* — Muhammad Raza
(74) *Attorney, Agent, or Firm* — Anova Law Group, PLLC

(57) ABSTRACT

The present disclosure relates to a method and system for guaranteeing website resource utilization rate using a content delivery network. The method includes following steps: receiving a domain name resolution request sent by a local domain name server; monitoring a resource load of a website source site corresponding to the domain name resolution request; utilizing monitoring data and according to a predetermined strategy to determine whether a result of the domain name resolution request is an address of the website
(Continued)

source site or a content delivery network system; and sending a domain name resolution result to the local domain name server.

12 Claims, 7 Drawing Sheets

(51) Int. Cl.
*G06F 9/00* (2006.01)
*G06F 11/00* (2006.01)
*H04L 12/26* (2006.01)
*G06F 16/957* (2019.01)
*H04L 12/24* (2006.01)

(52) U.S. Cl.
CPC ...... *G06F 16/9574* (2019.01); *H04L 43/0817* (2013.01); *H04L 61/1511* (2013.01); *H04L 61/609* (2013.01); *H04L 67/02* (2013.01); *H04L 67/025* (2013.01); *H04L 67/1008* (2013.01); *H04L 67/1029* (2013.01); *H04L 67/28* (2013.01); *H04L 67/2842* (2013.01); *H04L 41/0253* (2013.01); *H04L 67/22* (2013.01)

(56) References Cited

U.S. PATENT DOCUMENTS

| | | | | |
|---|---|---|---|---|
| 7,937,477 | B1* | 5/2011 | Day | G06Q 20/401 709/227 |
| 8,635,305 | B1* | 1/2014 | Subramaniam | G06F 16/9574 709/219 |
| 2003/0097564 | A1* | 5/2003 | Tewari | H04L 12/14 713/171 |
| 2004/0083283 | A1* | 4/2004 | Sundaram | H04L 29/12132 709/224 |
| 2008/0208961 | A1* | 8/2008 | Kim | G06F 17/30902 709/203 |
| 2012/0324110 | A1* | 12/2012 | Kohli | H04L 63/0281 709/226 |
| 2015/0334049 | A1* | 11/2015 | Miura | H04L 67/02 709/203 |
| 2015/0370490 | A1* | 12/2015 | Huici | H04L 67/2852 711/103 |

OTHER PUBLICATIONS

He World Intellectual Property Organization (WIPO) International Search Report for PCT/CN2014/095485, 5 pages, dated Sep. 8, 2015.

* cited by examiner

METHOD AND SYSTEM FOR GUARANTEEING RESOURCE UTILIZATION RATE OF WEBSITE USING CONTENT DISTRIBUTION NETWORK

CROSS-REFERENCES TO RELATED APPLICATIONS

This patent application is a national phase entry under 35 U.S.C § 371 of International Application No. PCT/CN2014/095483, filed on Dec. 30, 2014, which claims priority of Chinese patent application No. 201410720273.3, filed on Dec. 2, 2014. The above enumerated patent applications are incorporated by reference herein in their entirety.

FIELD OF THE DISCLOSURE

The present disclosure generally relates to the field of network technology and, more particularly, relates to a method and system for guaranteeing website resource utilization rate using a content delivery network.

BACKGROUND

A domain name system (DNS, also named domain name server or domain name service) is an important and basic internet service system configured to name computers and network services organized in a hierarchical domain structure. The occurrence of DNS makes it more convenient for users to visit the internet without remembering IP data strings that can be directly read by a machine. The conversion work between domain names and IP data strings is called domain name resolution, and a host that executes the conversion function is called a DNS server. When a user inputs a domain name into an application program, the DNS service may resolve the domain name to other related information corresponding to the domain name, such as an IP address, in order to complete the visit of a website.

The primary function of a content delivery network (CDN, also named content contribution network) is to deliver a content from a source site to users as fast as possible. The basic idea of CDN is to avoid any bottlenecks and stages in the internet that possibly affect the data transmission speed and stability, such that the content can be delivered faster and better. By disposing edge node servers throughout the internet, a visit request of a user may be redirected in real-time to the best edge node nearest to the user according to comprehensive information such as network traffic, as well as the load conditions, the distances to the user, and the response time of each edge node. CDN adds a global scheduling layer into the existing network architecture, and issues the content of the source site to the network edge nearest to the user, such that the user may access the desired content conveniently. Accordingly, CDN may solve the situation of the internet being too congested, speed up the response rate when the user visits a website, and avoid issues of the response rate being too low when the user visits a website due to a narrow network bandwidth of the source site outlet, a large volume of user visit, uneven distribution of network sites, a complex carrier network, and a narrow network bandwidth of the user access.

Although, based on the CDN, the visit rate to a website may be speeded up and the user experience may be improved, the website resource utilization rate may be reduced. Under extreme conditions, the back-to-source traffic to the website may keep decreasing and most traffic may be carried by the CDN network. Often, the CDN service modes provided by current CDN suppliers only have two types: "using acceleration" and "not using acceleration." While "not using acceleration" cannot guarantee website access quality, "using acceleration" guarantees the access quality but may lead to a relatively low level of the website resource utilization rate, which is not expected by website providers.

BRIEF SUMMARY OF THE DISCLOSURE

The technical issues to be solved by the present disclosure relates to providing a method and a system for guaranteeing website resource utilization rate using a content delivery network, which takes into consideration both website resource utilization rate and access quality.

The technical solution adopted by the present disclosure to solve the above-described technical issues is a method for guaranteeing website resource utilization rate using a content delivery network, which includes the following steps: receiving a domain name resolution request sent by a local domain name server; monitoring a resource load of a website source site corresponding to the domain name resolution request; utilizing monitoring data and according to a predetermined strategy to determine whether a result of the domain name resolution request is an address of the website source site or a content delivery network system; and sending the domain name resolution result to the local domain name server.

In one embodiment of the present disclosure, the method is executed outside of the content delivery network system, and the resolution result is a domain name of the content delivery network system.

In one embodiment of the present disclosure, the method is executed inside the content delivery network system, and the resolution result is an address of one of edge servers of the content delivery network system.

In one embodiment of the present disclosure, steps of utilizing the monitoring data and according to the predetermined strategy to determine whether the result of the domain name resolution request is the address of the website source site or the content delivery network system further includes: selecting a scheduling strategy, where parameters of the scheduling strategy include a preset upper limit and a preset lower limit of the resource load, and the address of the website source site; making a decision according to the resource load and the selected scheduling strategy, including: resolving the domain name resolution request into the address of the website source site at an initial moment; when the resource load of the website source site is between the preset upper limit and the preset lower limit, maintaining a resolution ratio to be unchanged; when the resource load of the website source site exceeds the preset upper limit, increasing the resolution ratio; when the resource load of the website source site is lower than the preset lower limit, reducing the resolution ratio. In particular, the resolution ratio is a ratio of the domain name resolution request being resolved into the content delivery network system.

In one embodiment of the present disclosure, a variation of the resolution ratio is pre-determined.

In one embodiment of the present disclosure, the variation of the resolution ratio $\Delta R$ is calculated using a following method: when the resource load of the website source site exceeds the preset upper limit, and the resolution ratio is increased, $\Delta R = |F_{now} - F_{upper}|/F_{upper}$; when the resource load of the website source site is lower than the preset lower limit, and the resolution ratio is reduced, $\Delta R = |F_{now} - F_{lower}|/F_{upper}$, where $F_{now}$ is the resource load of the website source site at a current moment, $F_{lower}$ is the preset lower limit of the resource load of the website source site, and $F_{upper}$ is the preset upper limit of the resource load of the website source site.

In one embodiment of the present disclosure, the website source site includes a single address, and when utilizing the monitoring data and according to the predetermined strategy to determine the result of the domain name resolution request, the address of the website source site is the single address.

In one embodiment of the present disclosure, the website source site includes a plurality of addresses, and the method further includes: acquiring an address of a local domain name server according to the domain name resolution request; recognizing a geographic location and a service provider of the local domain name server according to the address; and when utilizing the monitoring data and according to the predetermined strategy to determine the result of the domain name resolution request, the address of the website source site is one or more of the plurality of addresses.

In one embodiment of the present disclosure, the above-described method also includes selecting a corresponding scheduling strategy according to the geographic location and the service provider of the local domain name server, and the parameters of the scheduling strategy include lines of the service provider, a territory, a domain name or a domain name group, and the address of the website source site.

The present disclosure also provides a system for guaranteeing website resource utilization rate using a content delivery network, which includes: a domain name system module to receive a domain name resolution request; a monitoring module to monitor a resource load of a website source site corresponding to the domain name resolution request; and a scheduling module to utilize monitoring data and according to a predetermined strategy to determine whether a result of the domain name resolution request is an address of the website source site or a content delivery network system.

In one embodiment of the present disclosure, the above-described system is independent of the content delivery network system, and a resolution result is a domain name of the content delivery network system.

In one embodiment of the present disclosure, the above-described system is configured inside the content delivery network system, and the resolution result is an address of one of edge servers of the content delivery network system.

In one embodiment of the present disclosure, the scheduling module is configured to execute following steps: configuring a scheduling strategy, and parameters of the scheduling strategy include a preset upper limit and a preset lower limit of the resource load, and an address of the website source site; making a decision according to the resource load and the selected scheduling strategy, including: resolving the domain name resolution request into the address of the website source site at an initial moment; when the resource load of the website source site is between the preset upper limit and the preset lower limit, maintaining a resolution ratio to be unchanged; when the resource load of the website source site exceeds the preset upper limit, increasing the resolution ratio; when the resource load of the website source site is lower than the preset lower limit, reducing the resolution ratio. In particular, the resolution ratio is a ratio of the domain name resolution request being resolved into the content delivery network system.

In one embodiment of the present disclosure, a variation of the resolution ratio is pre-determined.

In one embodiment of the present disclosure, the variation of the resolution ratio $\Delta R$ is calculated using the following method: when the resource load of the website source site exceeds the preset upper limit, and the resolution ratio is increased, $\Delta R=|F_{now}-F_{upper}|/F_{upper}$, when the resource load of the website source site is lower than the preset lower limit, and the resolution ratio is reduced, $\Delta R=|F_{now}-F_{lower}|/F_{upper}$, where $F_{now}$ is the resource load of the website source site at a current moment, $F_{lower}$ is the preset lower limit of the resource load of the website source site, and $F_{upper}$ is the preset upper limit of the resource load of the website source site.

In one embodiment of the present disclosure, the website source site includes a plurality of addresses, and the system further includes: an acquisition module to acquire an address of a local domain name server according to the domain name resolution request; a recognition module to identify a geographic location and a service provider of the local domain name server according to the address; and when the scheduling module determines the result of the domain name resolution request, the address of the website source site is one or more of the plurality of addresses.

In one embodiment of the present disclosure, the scheduling module is configured to select a corresponding scheduling strategy according to the geographic location and the service provider of the local domain name server, and the parameters of the scheduling strategy include lines of the service provider, a territory, a domain name or a domain name group.

In one embodiment of the present disclosure, the above-described system also includes a resource module configured to manage resources of the website source site, set a monitoring mode, and save related monitoring configuration information.

The present disclosure also provides a system for guaranteeing website resource utilization rate using a content delivery network, which includes: a module configured to receive a domain name resolution request; a module configured to monitor a resource load of a website source site corresponding to the domain name resolution request; and a module configured to utilize monitoring data and according to a predetermined strategy to determine whether the result of the domain name resolution request is an address of the website source site or a content delivery network system.

The method and system for guaranteeing website resource utilization rate of the present disclosure may integrate the CDN service website with the resources of the website provider via intelligent scheduling, prioritize utilization of the website resources, and monitor the usage condition of the website resources in real-time. When the website resource utilization rate exceeds a preset value, the DNS resolution ratio may be modified to gradually guide the traffic to the CDN service network, thus alleviating the load pressure of the source site. When the website traffic is lower than the lower limit of the preset value, the DNS solution ratio may be modified to gradually guide the traffic back to the website, thus increasing the website resource utilization rate. By using the disclosed method and system, the website resource utilization rate may be intelligently controlled within a reasonable range without lowering the access quality.

BRIEF DESCRIPTION OF THE DRAWINGS

To make the above-described objects, features and advantages of the present disclosure clearer and easier to understand, specific embodiments of the present disclosure will be made in detail with reference to the accompanying drawings, in which.

DETAILED DESCRIPTION

Website resource utilization rate is mainly reflected in various indicators such as visit traffic and bandwidth usage, and guaranteeing the website resource utilization rate within a reasonable range is a goal pursued by website providers. If the website resource utilization rate is too low, basic IT resources may not be effectively allocated, thereby increasing the operation cost of the website. If the website resource utilization rate is too high, a service response may be slow, thereby harming the user experience and resulting in customer loss.

Though a CDN may speed up the visit rate to a website and improve the user experience, the website resource utilization rate is not taken into account by the CDN. Accordingly, using the CDN may lower the website resource utilization rate, and most traffic may be carried by the CDN network.

Embodiments of the present disclosure provide a method for guaranteeing the resource utilization rate of a website using the CDN, which may monitor and adjust the resource utilization rate of the website.

Figure 1:
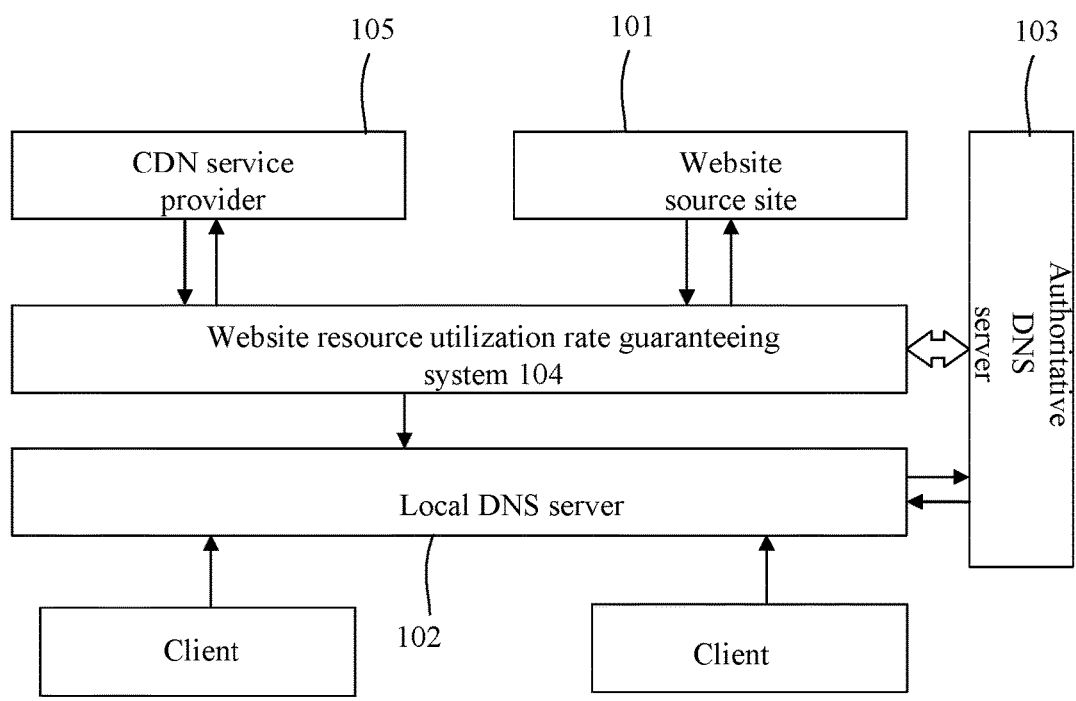
FIG. 1 illustrates a schematic view of a network environment consistent with an embodiment of the present disclosure.

FIG. 1 illustrates a schematic view of a network environment consistent with an embodiment of the present disclosure. As shown in FIG. 1, a network environment 100 may include a website source site 101, a local DNS server 102, an authoritative DNS server 103, a website resource utilization rate guaranteeing system 104, a CDN system 105, and a plurality of clients 106. The website source site 101 may consist of one or a plurality of servers, and is the main entity to store website content, which may provide content to the plurality of clients 106. The website source site 101 may have one or a plurality of addresses, and each address may correspond to one server or a plurality of servers. Due to the limitation on traffic load, the CDN system 105 may partially replace the website source site 101 to respond to content request from a part of the clients 106. A network topology of the CDN system 105 is illustrated FIG. 7. The CDN system 105 may be configured with a plurality of geographically dispersed edge node servers or clusters 710 to provide the content to nearby clients 106. The local DNS server 102 may be responsible to receive a domain name resolution request sent by the client 106, and forward the request of the client 106 to a destination site. In one embodiment, the destination site may be a server of the website source site 101 or the CDN system 105, depending on the resolution result of the website resource utilization rate guaranteeing system 104. Obviously, when the CDN system 105 is the destination site, the CDN system 105 may further forward the request to the edge node servers 710. The local DNS server 102 may forward the domain name resolution request to the authoritative DNS server 103. The authoritative DNS server 103 may receive the domain name resolution request from the local. DNS server 102, and send a domain name of the website resource utilization rate guaranteeing system 104 to the local DNS server 102. The local DNS server 102 may turn to the website resource utilization rate guaranteeing system 104 to request domain name resolution. The website resource utilization rate guaranteeing system 104 may be configured to receive the domain name resolution request from the local DNS server 102, and monitor the resource utilization condition of the website source site 101. Further, according to a strategy and monitoring data, the website resource utilization rate guaranteeing system 104 may select the website source site 101 or the CDN system 105 as the destination site and send the result to the local. DNS server 102.

Specifically, an appropriate traffic range may be configured for the website source site 101, representing a resource load. The appropriate traffic range may be defined by a preset upper traffic limit and a preset lower traffic limit. The website source utilization rate guaranteeing system 104 may acquire traffic data of the website source site 101, and make a decision according to the traffic data and a selected scheduling strategy. When the traffic of the website source site 101 is lower than the preset upper traffic limit, the resource utilization rate of the website source site 101 may be within an allowable range, and the domain name resolution request sent by the local DNS server 102 may be resolved into an address of the website source site 101. When the traffic of the website source site 101 is not lower than (equal to or greater than) the preset upper traffic limit, the resource utilization rate of the website source site 101 may be too high, and the resolution ratio may be increased. The resolution ratio refers to a ratio of the domain name resolution request being resolved into the CDN system 105. When the traffic of the website source site 101 falls back to be lower than the preset lower traffic limit, the resource utilization rate of the website source site 101 may be too low, and the ratio of the domain name resolution request being resolved into the CDN system 105 may be lowered. If the traffic of the website source site 101 does not fall back to be lower than the preset lower traffic limit, the resolution ratio may remain unchanged. That is, the website resource utilization rate guaranteeing system 104 may preferentially guide the traffic to the website source site 101, unless the resource utilization rate of the website source site 101 is too high.

Figure 6:
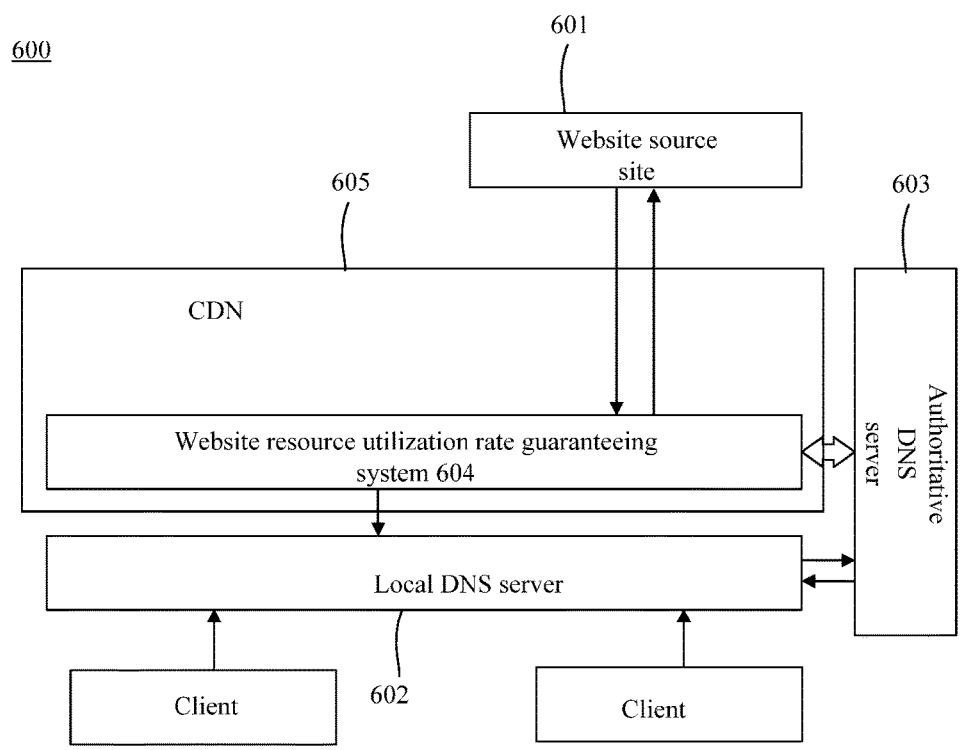
FIG. 6 illustrates a network environment consistent with another embodiment of the present disclosure.

FIG. 6 illustrates a network environment consistent with another embodiment of the present disclosure. As shown in FIG. 6, a network environment 600 may include a website source site 601, a local DNS server 602, an authoritative DNS server 603, a website resource utilization rate guaranteeing system 604, a CDN system 605 and a plurality of clients 606. Different from FIG. 1, in an embodiment illustrated in FIG. 6, the website resource utilization rate guaranteeing system 604 may be configured inside the CDN system 605 instead of being independent of the CDN system 605. Correspondingly, in one embodiment, the destination site may be a server of the website source site 601 or an edge node server in the CDN system 605, depending on the resolution result of the website resource utilization rate guaranteeing system 604.

Figure 7:
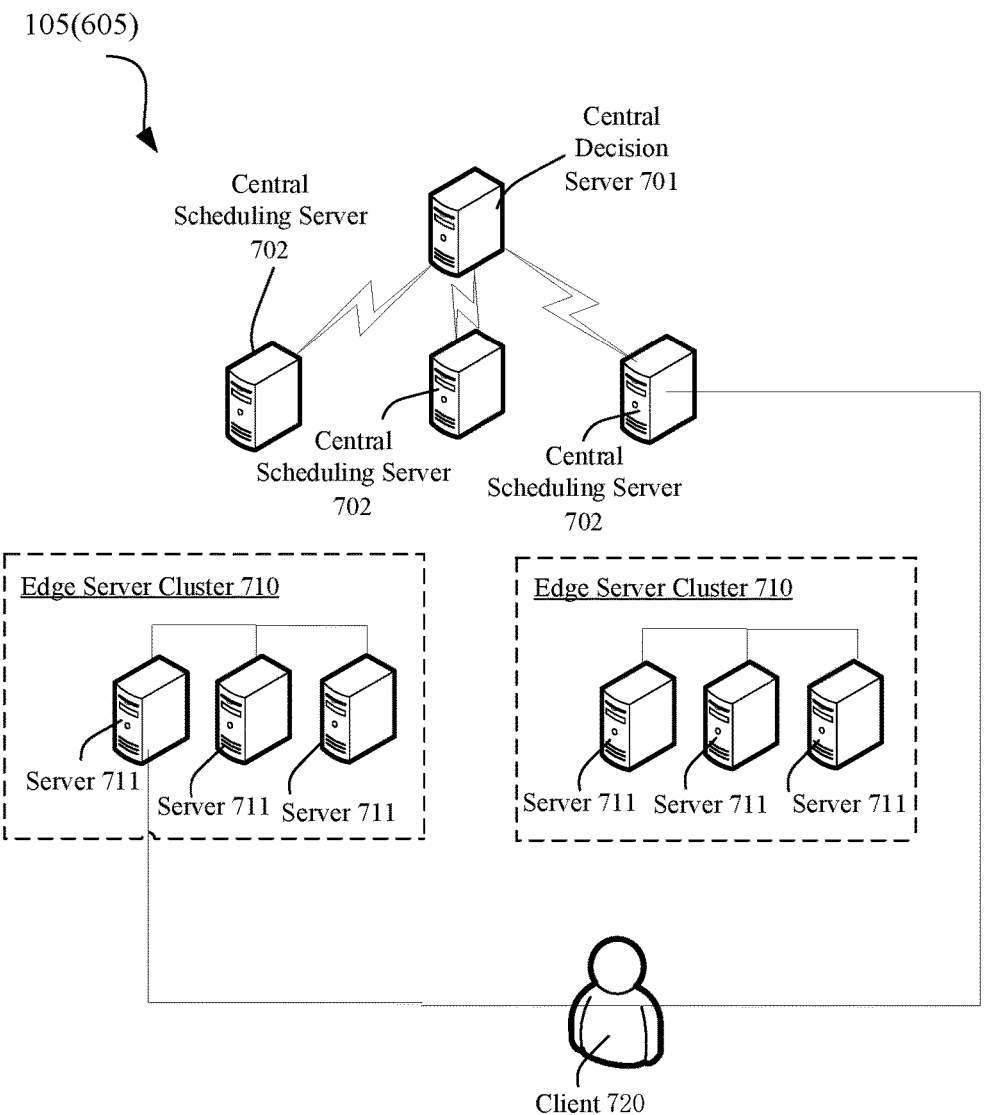
FIG. 7 illustrates a CDN network topology according to an embodiment of the present disclosure.

That is, the website resource utilization guaranteeing system 604 may, when the domain name is resolved into the CDN system 605, further determine which edge server or cluster the domain name should be resolved into. Specifically, FIG. 7 illustrates a CDN network topology according to one embodiment of the present disclosure. As shown in FIG. 7, the CDN system 605 may include a central decision-making server 701, a plurality of central scheduling servers 702, and a plurality of edge server clusters 710, and these devices may be connected via the internet. Each edge server cluster 710 may be configured with a plurality of servers 711. A plurality of clients 720 may be connected to the CDN system 605 to acquire the requested content. Via the cooperation of the central decision server 701 and the central scheduling servers 702, a jumping uniform resource locator (URL) with edge server clusters may be returned to the client 720 according to the geological location where the client is located and the requested content.

The present embodiment may have the same strategy as aforementioned embodiment regarding the traffic redirection, which is described hereinafter.

Figure 2:
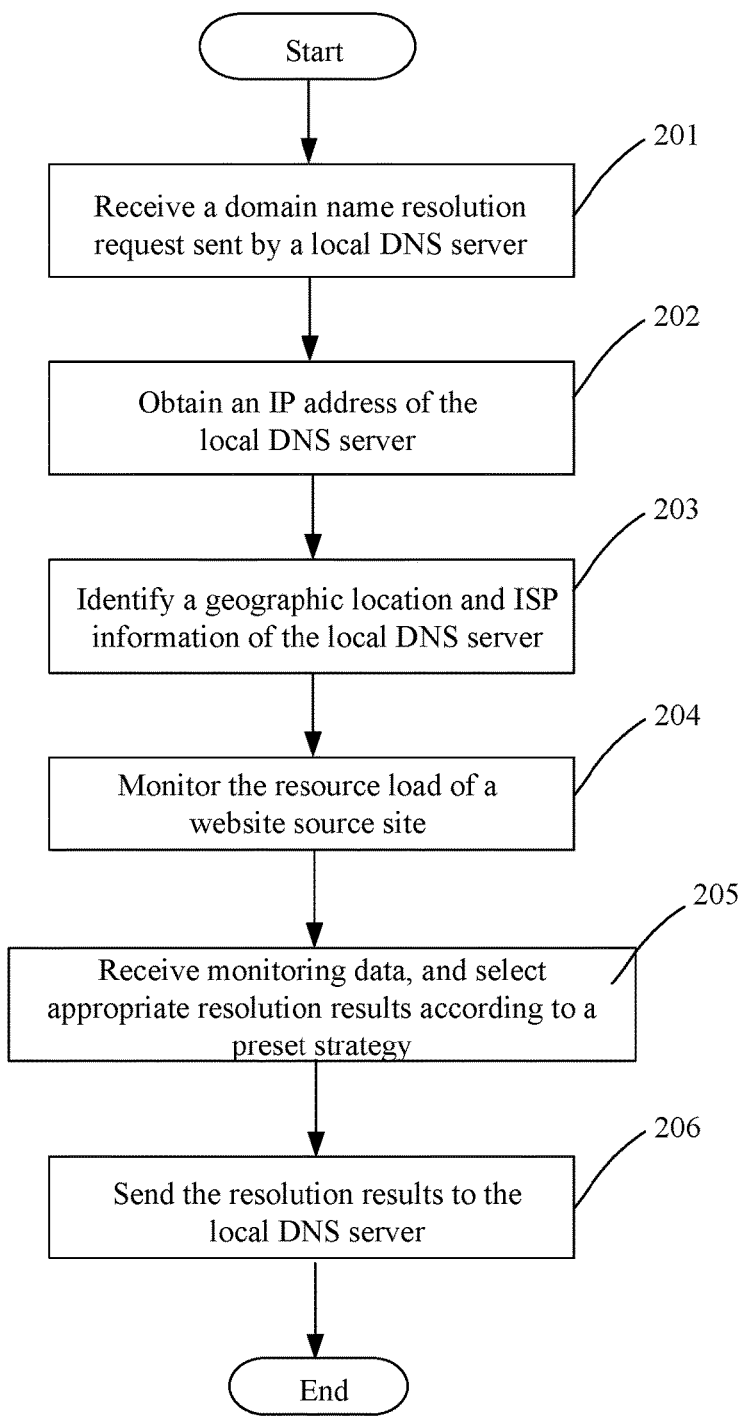
FIG. 2 illustrates a flow chart of a method for guaranteeing website resource utilization rate consistent with an embodiment of the present disclosure.

FIG. 2 illustrates a flow chart of a method for guaranteeing website resource utilization rate consistent with an embodiment of the present disclosure. As shown in FIG. 2, the disclosed website resource utilization rate guaranteeing method may be executed by the website resource utilization rate guaranteeing system 104, including following steps:

Step 201, receiving the domain name resolution request sent by the local DNS server 102.

The domain name resolution request of the local DNS server 102 may be acquired by the sub-domain name provided by the authoritative DNS server 103.

Step 202, according to the domain name resolution request, obtaining an IP address of the local DNS server 102.

Step 203, utilizing the IP address to identify a geographic location and internet service provider (ISP) information of the local DNS server 102.

Step 204, monitoring the resource load of the website source site 101.

For example, monitoring may include but not limit to monitoring a performance load and a traffic condition of a website server or cluster. More specifically, the website server program resource utilization rate, the CPU load condition, the memory utilization condition, the website request number, and the website connection number, etc. may be monitored.

Step 205, receiving monitoring data, and selecting an appropriate resolution result according to a predetermined strategy. The resolution result may be an IP address of a website source site or a CDN system.

For the embodiment illustrated in FIG. 1, because a process of the website resource utilization rate guaranteeing system 104 is executed outside of the CDN system, when the resolution result is the CDN system, the resolution result actually refers to the domain name of the CDN system, namely, the domain name provided by the service provider of the CDN system.

For the embodiment illustrated in FIG. 2, because the process of the website resource utilization rate guaranteeing system 104 is executed inside the CDN system, the resolution result actually refers to an address of an edge server of the CDN system.

Step 206, sending the resolution result to the local DNS server 102.

It should be noted that, Steps 202 and 203 may be implemented only under the condition that the website source site 101 includes a plurality of addresses. In this case, in Step 205, one address may be selected from the plurality of addresses to be the IP address of the website source site according to the predetermined strategy. If the website source site 101 includes only one address, Steps 202 and 203 may be omitted. In Step 205, the address may be directly used as the IP address of the website source site.

Figure 3:
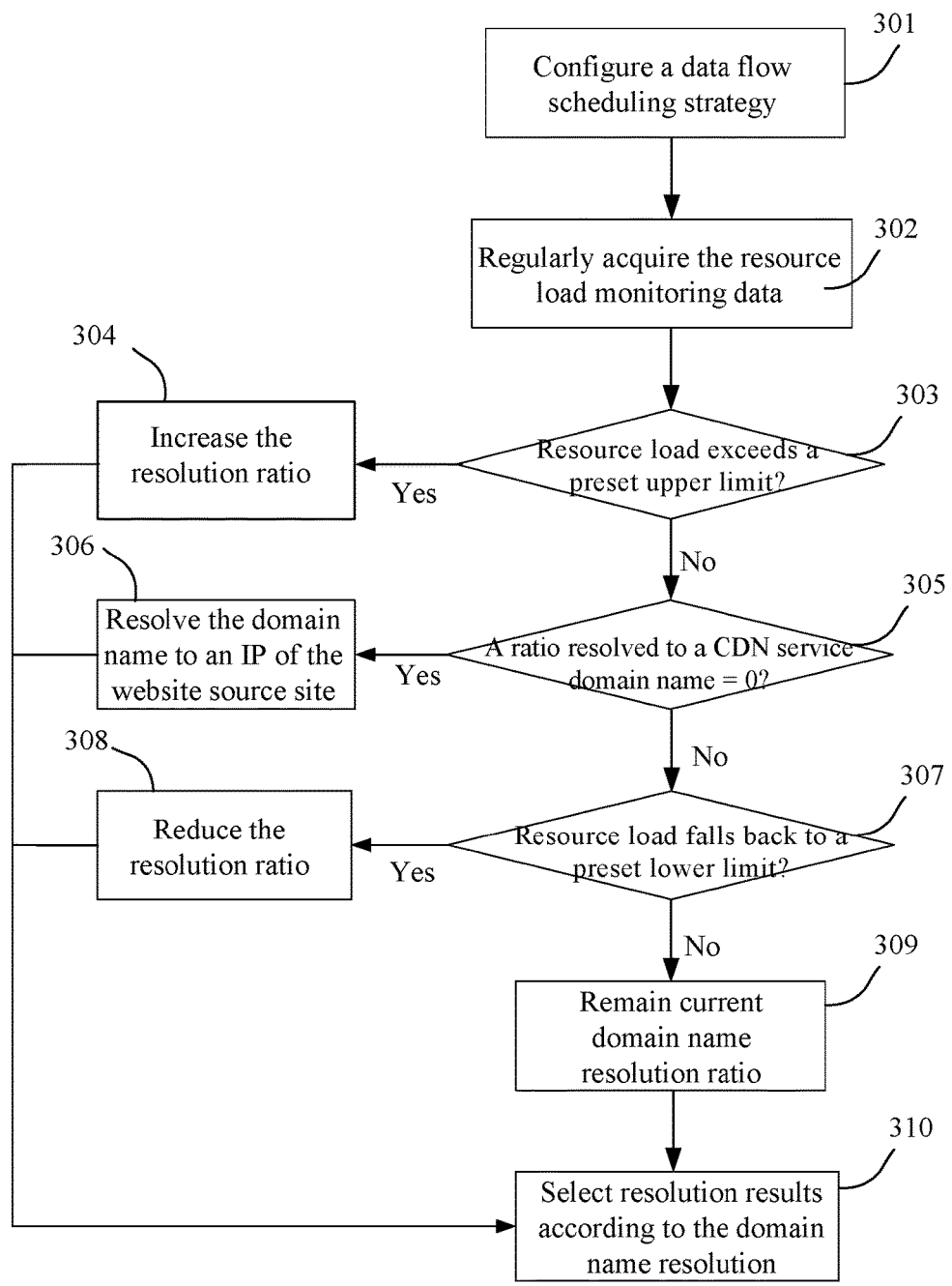
FIG. 3 illustrates a flow chart of a traffic scheduling method consistent with an embodiment of the present disclosure.

FIG. 3 illustrates a flow chart of a traffic scheduling method consistent with an embodiment of the present disclosure. As shown in FIG. 3, in one embodiment, Step 205 may further include following steps:

Step 301, configuring a traffic scheduling strategy.

Parameters of the scheduling strategy may include but not limited to A record (IP of a source site), an upper limit of a preset resource load, and a lower limit of the preset resource load.

Step 302, regularly acquiring the resource load monitoring data of the website source site 101. Here, the resource load may use various different measurement indicators, including but not limited to the resource percentage, the traffic value, etc.

Step 303, determining whether or not the resource load exceeds the preset upper limit value, if the preset upper limit value is exceeded, Step 304 may be used to increase the resolution ratio into the CDN system, and the next step is Step 310; if the resource load does not exceed the preset upper limit value, Step 305 may be the next step.

Step 305, determining whether or not the resolution ratio into the CDN system is 0, if the ratio resolved into the CDN system is 0 (namely, not using acceleration service), Step 306 may be the next step, which resolves the domain name into an IP address of the website source site, otherwise, Step 306 may be the next step.

Step 307, if the resource load is lower than the preset lower limit value, the resolution ratio into the CDN system may be reduced in Step 308, and Step 310 may be the next step, otherwise, the resource load may be between the preset upper limit value and the preset lower limit value, and the resolution ratio of a current domain name may remain the same in Step 309.

Step 310, selecting a resolution result according to the resolution ratio of the domain name.

An initial resolution ratio may be set as 0. That is, all domain name resolution requests may be resolved into an address of the website source site. Then the resolution ratio may be re-determined according to traffic variation.

In one embodiment, a method to determine the resolution ratio may be as follows:

$$R_{cdn}=R'_{cdn}\pm\Delta R \quad \text{(equation 1)}$$

Where $R_{cdn}$ is a ratio currently resolved into the CDN system, $R'_{cdn}$ is a ratio previously resolved into the CDN system, and $\Delta R$ represents a variation of the ratio resolved into the CDN system.

A plurality of methods may be applied to determine $\Delta R$, for example, it may be determined by a user, or may be a preset value of the system.

$\Delta R$ may also be calculated via the resource load (e.g., traffic) of the source site:

when the source site traffic exceeds the preset upper traffic limit and the resolution ratio needs to be increased:

$$\Delta R=|F_{now}-F_{upper}|/F_{upper} \quad \text{(equation 2)}$$

when the source site traffic is lower than the preset lower traffic limit and the resolution ratio needs to be decreased:

$$\Delta R = |F_{now} - F_{lower}|/F_{upper} \quad \text{(equation 3)}$$

Where $F_{now}$ is the traffic of the website source site at a current moment, $F_{lower}$ is the preset lower traffic limit of the website source site, and $F_{upper}$ is the preset upper traffic limit of the website source site.

In a preferred embodiment, Step 301 may allocate a traffic scheduling strategy for requests with different ISP lines and different geographic locations. Accordingly, the parameters of traffic scheduling strategy may also include ISP lines, a territory, and a domain names (or a domain name group). In this case, different ISP lines may be allowed to share the same strategy.

Figure 4:
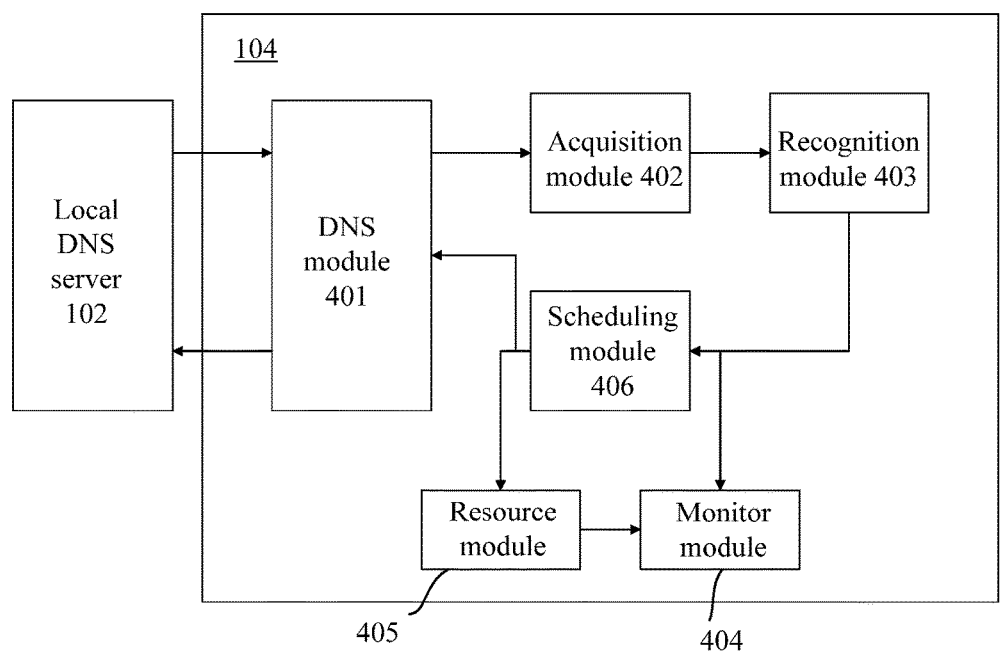
FIG. 4 illustrates a logic diagram of a system for guaranteeing website resource utilization rate consistent with an embodiment of the present disclosure.

FIG. 4 illustrates a logic diagram of a system for guaranteeing website resource utilization rate consistent with an embodiment of the present disclosure. As shown in FIG. 4, the disclosed website resource utilization rate guaranteeing system 104 may also include a DNS module 401, an acquisition module 402, a recognition module 403, a monitoring module 404, a resource module 405, and a scheduling module 406. The DNS module 401 may be configured to respond to a request of the local DNS server 102 (referring to FIG. 1), and return the result to the local DNS server 102. The acquisition module 402 may be configured to acquire the IP address of the local DNS server 102. As an optional module, the recognition module 403 may be configured to, when the website source site has a plurality of addresses, acquire the geographic location and ISP information according to aforementioned IP addresses. The monitoring module 404 may be configured to monitor the resource load condition of the website source site 101. The resource module 405 may be configured to manage the website source site resources, set a monitoring mode, and save related monitoring configuration information. The scheduling module 406 may perform processing and analysis based on current information and strategy to provide an appropriate resolution result.

In embodiments of the present disclosure, the website resource utilization rate guaranteeing system 104 may be implemented by software, hardware, or a combination of software and hardware. For hardware implementation, embodiments described herein may be practiced in one or a plurality of application specific integrated circuits (ASIC), digital signal processors (DSP), digital signal processing devices (DSPD), programmable logic devices (PLD), field programmable gate arrays (FPGA), processors, controllers, micro-controllers, micro-processor, other electronic devices executing the aforementioned functions, or any combination of above-described devices. Under partial conditions, this type of embodiments may be practiced via the controller. For software implementation, the website resource utilization rate guaranteeing system 104 may include each above-described software module stored in a storage of a server and loaded into a memory for implementation by a processor. Or, each software module may also be dispersedly stored in storages of a plurality of servers, and may be loaded into memories of each server for implementation by the processor. Via network coordination, the servers may simultaneously realize functions of the website resource utilization rate guaranteeing system 104.

In one embodiment, the scheduling module 406 may be responsible for coordinating a plurality of modules. Specifically, the scheduling module 406 may issue monitoring tasks to the monitoring module 404. The scheduling module 406 itself may collect the operational data of the server of the website source site 101, and determine domain name resolution rules according to the scheduling strategy. The domain name resolution rules may include resolution results of domain names and corresponding resolution distribution ratios. The scheduling module 406 may issue the domain name resolution rules to the DNS module 401.

For example, the monitoring mode set by the resource module 405 may be a simple network management protocol (SNMP) mode, or an embedded monitoring agent program mode.

Figure 5:
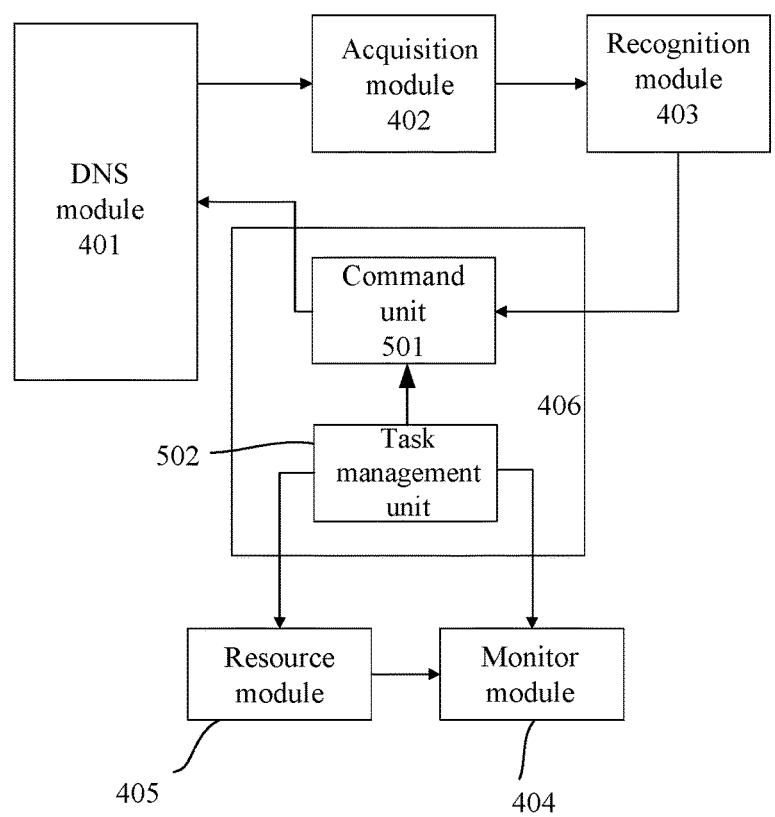
FIG. 5 illustrates a block diagram of a scheduling module consistent with an embodiment of the present disclosure.

FIG. 5 illustrates a block diagram of a scheduling module consistent with an embodiment of the present disclosure. Referring to FIG. 5, the scheduling module 406 may include a task management unit 501 and a command unit 502. As shown in FIG. 5, the task management unit 501 may be configured to manage strategies, select appropriate resources, allocate monitoring tasks, and acquire the visit, traffic to the website source site 101. The command unit 502 may utilize the scheduling strategy and according to the visit traffic etc. to the website source site to calculate the resolution ratio, and generate and issue a resolution command to the DNS module 401.

Hereinafter, an example is given to illustrate a specific implementation process of the above-described method assume that the resource utilization rate and access quality of a domain name 'www.a.com' need to be guaranteed. The DNS module 401 of the website resource utilization rate guaranteeing system 104 may be an authoritative DNS server of the domain name 'www.a.com', and the domain name 'www.a.com' may have an alias 'www.a.1xdns.com' in the DNS module 401. The website 'www.a.com' may have registered a content service at the CDN service provider, and the CDN service provider may allocate a service domain name 'www.a.cdn.com' to the website for use. The allocation of strategies and monitoring information may be fulfilled via website providers assume that a scheduling strategy allocated to 'www.a.com' is shown in Table 1 as follows:

TABLE 1

| ISP | Geographic location | Scheduling domain name | Preset upper traffic limit | Preset lower traffic limit | Domain name of the CDN service provider | IP of a website resource |
|---|---|---|---|---|---|---|
| China Unicorn | Fujian | www.a.com | 6 Gbps | 4 Gbps | www.a.cdn.com | 1.1.1.1; 1.1.1.2 |
| China Telecom | Fujian | www.a.com | 8 Gbps | 6 Gbps | www.a.cdn.com | 2.2.2.1; 2.2.2.2 |

When a user types in the website 'www.a.com' in his or her internet browser, the browser may request the local DNS server 102 to resolve 'www.a.com', and the local DNS server 102 may send the request to the authoritative DNS server 103. The authoritative DNS server 103 may return the alias 'www.a.1xdns.com' of the website 'www.a.com' to the local DNS server 102. The local DNS server 102 may acquire an IP address of 'www.a.1xdns.com' from the DNS module 401 of the website resource utilization rate guaranteeing system 104. The DNS module 401 may first acquire an IP address of the local DNS server 102, and inquire a corresponding geographic location and ISP information according to the IP address. Assume the geographic location of the local DNS server 102 is Fujian, and ISP is China Telecom.

According to the scheduling strategy table, the scheduling module 406 may automatically issue the monitoring task that performs the resource monitoring of '2.2.2.1.' and '2.2.2.2' to the monitoring module 404, inquire the monitoring result, and make the following conclusions according to the strategy:

when the traffic of the website source site exceeds the preset upper traffic limit (8 Gbps), assume the current website source site traffic is 9 Gbps and 'www.a.1xdns.com' is resolved into the source site, the following result may be obtained according to equation 1 and equation 2:

$$R_{cdn}=0+|9\ Gbps-8\ Gbps|/8\ Gbps*100\%=12.5\%.$$

By then, 'www.a.1xdns.com' may be resolved into 'www.a.cdn.com' by a ratio of 12.5%, and resolved into IP addresses of '2.2.2.1' and '2.2.2.2' by a ratio of 87.5%;

When the traffic of the website source site is lower than the preset lower traffic limit (6 Gbps), assume the current website source site traffic is 4 Gbps and 'www.a.1xdns.com' is resolved into 'www.a.cdn.com' by a ratio of 60%, the following result may be obtained according to equation 1 and equation 3:

$$R_{cdn}=\frac{1}{2}-|4\ Gbps-6\ Gbps|/6\ Gbps*100\%=16.7\%.$$

By then, 'www.a.1xdns.com' may be resolved into 'www.a.cdn.com' by a ratio of 16.7%, and resolved into IP addresses of '2.2.2.1' and '2.2.2.2' by a ratio of 83.3%.

Accordingly, the disclosed embodiment may redirect the traffic by controlling the domain name resolution, such that the traffic may preferentially flow to the resources of the website source site 101. When the resource of the website source site 101 fails to satisfy the requirement, the traffic may be timely guided to CDN acceleration service, thus alleviating the load, of the website source site 101.

From above-described embodiments of the present disclosure, the method and system for guaranteeing website resource utilization rate may integrate the CDN service website and the resources of the website provider via intelligent scheduling, prioritize utilization of the website resource, and monitor the usage condition of the website resources in real-time. When the website resource utilization rate exceeds a preset value, the DNS resolution ratio may be modified to gradually guide the traffic to the CDN service network, thus alleviating the load pressure of the source site. When the website traffic is lower than the preset lower limit, the DNS solution ratio may be modified to gradually guide the traffic back to the website, thus increasing the website resource utilization rate. By using the disclosed method and system, the website resource utilization rate may be intelligently controlled within a reasonable range without reducing the access quality.

Although the present disclosure has been described as above with reference to the preferred embodiments, these embodiments are not construed as limiting the present disclosure. Various modifications and variations may be made by anyone skilled in the art without departing from the spirit and scope of the present disclosure, and the protection scope of the present disclosure is defined by the appended claims.

What is claimed is:

1. A method for guaranteeing website resource utilization rate executed in a content distribution network (CDN) system, the method comprising:
   receiving, by a processor in the CDN system, a domain name resolution request sent by a local domain name server;
   monitoring, by the processor in the CDN system, a resource load of a website source site in response to the domain name resolution request, and further monitoring a website server program resource utilization rate, a CPU load, a memory utilization condition, number of website request, and website connection number, of the website source site;
   utilizing, by the processor in the CDN system, monitoring data and a predetermined strategy to determine a domain name resolution result for the domain name resolution request by selecting one of an address of the website source site and the content distribution network (CDN) system as a destination site, wherein the resource load is monitored in real-time for a polarized utilization of the website resource site, in combination with a utilization of the content distribution network (CDN) system capable of taking at least a portion of the resource load; and
   sending the domain name resolution result to the local domain name server.
   wherein the domain name resolution result for the domain name resolution request includes a resolution ratio resolved to the CDN system:

$$R_{cdn}=R'_{cdn}\pm\Delta R$$

where $R_{cdn}$ is the resolution ratio resolved to the CDN system, $R'_{cdn}$ is a previous resolution ratio resolved to the CDN system and an initial resolution ratio is 0, $\Delta R$ represents a change amount of the resolution ratio,
   wherein the change amount $\Delta R$ of the resolution ratio is calculated using a following method:
   when the resource load of the website source site exceeds the preset upper limit, and the resolution ratio is increased, $$\Delta R=|F_{now}-F_{upper}|/F_{upper},$$

when the resource load of a website source site is lower than the preset lower limit, and the resolution ratio is reduced, $$\Delta R=|F_{now}-F_{lower}|/F_{lower}$$

where $F_{now}$ is the resource load of the website source site at a current moment $F_{lower}$ is the preset lower limit of the resource load of the website source site, and $F_{upper}$ is the preset upper limit of the resource load of the website source site.

2. The method according to claim 1, wherein utilizing, by the processor in the CDN system, the monitoring data and the predetermined strategy to determine the domain name resolution result includes:
   selecting a scheduling strategy, wherein parameters of the scheduling strategy include a preset upper limit and a preset lower limit of the resource load, and the address of the website source site;
   determining the domain name resolution result based on the resource load and the selected scheduling strategy, including:
   initially resolving the domain name resolution request to be the address of the website source site;
   when the resource load of the website source site is between the preset upper limit and the preset lower limit, keeping a resolution ration unchanged, wherein the resolution ratio is a ratio of domain name request being resolved to the content distribution network (CDN) system;
   when the resource load of the website source site exceeds the preset upper limit, increasing the resolution ratio to resolve to the CDN system; and
   when the resource load of the website source site is lower than the preset lower limit, reducing the resolution ratio to resolve back to the website source site.

3. The method according to claim 1, wherein the website source site includes a single address, and the address of the website source site is the single address when utilizing the monitoring data and the predetermined strategy to determine the domain name resolution result for the domain name resolution request.

4. The method according to claim 1, wherein the website source site includes a plurality of addresses, the method further comprising:
   acquiring an address of the local domain name server according to the domain name resolution request;
   recognizing a geographic location and a service provider of the local domain name server according to the address of the local domain name server; wherein
   when utilizing the monitoring data and the predetermined strategy to determine to domain name resolution result for the domain name resolution request, the address of the website source site includes one or more of the plurality of addresses.

5. The method according to claim 4, further comprising:
   selecting a corresponding scheduling strategy according to the geographic location and the service provider of the local domain name server, wherein parameters of the scheduling strategy include lines of the service provider, a territory, the domain name or a domain name group, and the address of the website source site.

6. The method according to claim 1, wherein the resource load includes a resource percentage and a data flow value.

7. A content distribution network (CDN) system for guaranteeing website resource utilization rate, comprising:
   at least a server, comprising a processor configured for:
      receiving a domain name resolution request sent by a local domain name server;
      monitoring a resource load of a website source site in response to the domain name resolution request, and further monitoring a website server program resource utilization rate, a CPU load, a memory utilization condition, number of website requests, and website connection number, of the website source site; and
   utilizing monitoring data and a predetermined strategy to determine a domain name resolution result for the domain name resolution request by selecting one of an address of the website source site and the content distribution network (CDN) system as a destination site, wherein the resource load is monitored in real-time for a polarized utilization of the website resource site, in combination with a utilization of the content distribution network (CDN) system capable of taking at least a portion of the resource load; and
   sending the domain name resolution result to the local domain name server,
   wherein the domain name resolution result for the domain name resolution request includes a resolution ration resolved to the CDN system:

$R_{cdn}=R'_{cdn} \pm \Delta R$ where $R_{cdn}$ is the resolution ratio resolved to the CDN system, $R'_{cdn}$ is a previous resolution ratio resolved to the CDN system and an initial resolution ratio is 0, $\Delta R$ represents a change amount of the resolution ratio,
   wherein the change amount $\Delta R$ of the resolution ratio is calculated using a following method:

when the resource load of the website source site exceeds the preset upper limit, and the resolution ratio is increased, $\Delta R=|F_{now}-F_{upper}|/F_{upper}$, when the resource load of a website source site is lower than the preset lower limit, and the resolution ratio is reduced, $\Delta R=|F_{now}-F_{lower}|/F_{lower}$ where $F_{now}$ is the resource load of the website source site at a current moment, $F_{lower}$ is the preset lower limit of the resource load of the website source site, and $F_{upper}$ is the preset upper limit of the resource load of the website source site.

8. The system according to claim 7, wherein the processor is further configured for:
   configuring a scheduling strategy, wherein parameters of the scheduling strategy include a preset upper limit and a preset lower limit of the resource load, and the address of the website source site;
   determining the domain name resolution result based on the resource load and the selected scheduling strategy, including:
      initially resolving the domain name resolution request to be the address of the website source site;
      when the resource load of the website source site is between the preset upper limit and the preset lower limit, keeping a resolution ration unchanged, wherein the resolution ratio is a ratio of domain name request being resolved to the content distribution network (CDN) system;
      when the resource load of the website source site exceeds the preset upper limit, increasing the resolution ratio to resolve to the CDN system; and
      when the resource load of the website source site is lower than the preset lower limit, reducing the resolution ratio to resolve back to the website source site.

9. The system according to claim 7, wherein the website source site includes a plurality of addresses, and the processor is further configured for:
   acquiring an address of a local domain name server according to the domain name resolution request;
   recognizing a geographic location and a service provider of the local domain name server according to the address of the local domain name server; and
   when the scheduling module determines the domain name resolution result for the domain name resolution request, the address of the website source site includes one or more of the plurality of addresses.

10. The system according to claim 9, wherein the processor is further configured for selecting a corresponding scheduling strategy according to the geographic location and the service provider of the local domain name server, wherein parameters of the scheduling strategy include lines of the service provider, a territory, the domain name or a domain name group.

11. The system according to claim 7, wherein the processor is further configured to manage resources of the website source site, set a monitoring mode, and save related monitoring configuration information.

12. The system according to claim 7, wherein the resource load includes a resource percentage and a data flow value.

* * * * *